US 11,319,940 B2

(12) United States Patent
Hayama et al.

(10) Patent No.: US 11,319,940 B2
(45) Date of Patent: May 3, 2022

(54) CAPACITY CONTROL VALVE

(71) Applicant: EAGLE INDUSTRY CO., LTD., Tokyo (JP)

(72) Inventors: Masahiro Hayama, Tokyo (JP); Yoshihiro Ogawa, Tokyo (JP); Keigo Shirafuji, Tokyo (JP); Kohei Fukudome, Tokyo (JP); Takahiro Ejima, Tokyo (JP); Daichi Kurihara, Tokyo (JP); Wataru Takahashi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/967,692

(22) PCT Filed: Feb. 14, 2019

(86) PCT No.: PCT/JP2019/005199
§ 371 (c)(1),
(2) Date: Aug. 5, 2020

(87) PCT Pub. No.: WO2019/159998
PCT Pub. Date: Aug. 22, 2019

(65) Prior Publication Data
US 2021/0033081 A1 Feb. 4, 2021

(30) Foreign Application Priority Data
Feb. 15, 2018 (JP) .............................. JP2018-025442

(51) Int. Cl.
*F04B 27/18* (2006.01)

(52) U.S. Cl.
CPC .. *F04B 27/1804* (2013.01); *F04B 2027/1813* (2013.01); *F04B 2027/1827* (2013.01); *F04B 2027/1831* (2013.01)

(58) Field of Classification Search
CPC .......... F04B 27/1804; F04B 2027/1813; F04B 2027/1827; F04B 2027/1831; F16K 11/14; F16K 11/161
(Continued)

(56) References Cited

U.S. PATENT DOCUMENTS

| 6,010,312 A | 1/2000 | Suitou et al. ............... 417/222.2 |
| 6,213,727 B1 * | 4/2001 | Kawaguchi ......... F04B 27/1804 |
| | | 417/222.2 |

(Continued)

FOREIGN PATENT DOCUMENTS

| CN | 111684156 | 9/2020 | .............. F04B 27/18 |
| EP | 1091124 | 11/2001 | .............. F04B 27/18 |

(Continued)

OTHER PUBLICATIONS

International Search Report and Written Opinion issued in PCT/JP2019/002207, dated Apr. 23, 2019, with English translation, 13 pages.

(Continued)

*Primary Examiner* — Devon C Kramer
*Assistant Examiner* — Joseph S. Herrmann
(74) *Attorney, Agent, or Firm* — Hayes Soloway P.C.

(57) ABSTRACT

A capacity control valve includes: a housing with a Pc port, a Pd port, a first Ps port and a second Ps port; a main valve element having a main valve portion adapted to contact with and separate from a main valve seat to close and open a communication between the Pd port and the Pc port by a drive force of a solenoid; an intermediate communication path communicating with the Pc port and the first Ps port; a pressure-sensitive valve configured to open and close the intermediate communication path by an ambient pressure; and a differential pressure valve including a differential pressure valve element configured to open and close a (Continued)

communication between the Pc port and the second Ps port and a communication between the Pc port and a pressure-sensitive chamber by the differential pressure valve element moved by a pressure.

20 Claims, 8 Drawing Sheets

(58) Field of Classification Search
USPC .................................................. 417/222.2
See application file for complete search history.

(56) References Cited

U.S. PATENT DOCUMENTS

| | | | |
|---|---|---|---|
| 6,354,811 B1 | 3/2002 | Ota et al. | 417/222 |
| 6,358,017 B1 * | 3/2002 | Ota | F04B 27/1804 417/222.2 |
| 6,361,283 B1 | 3/2002 | Ota et al. | 417/222.2 |
| 6,385,982 B1 * | 5/2002 | Ota | F04B 27/1804 62/209 |
| 6,457,319 B1 | 10/2002 | Ota et al. | 62/228.3 |
| 6,485,267 B1 | 11/2002 | Imai et al. | 417/222.2 |
| 7,077,380 B2 * | 7/2006 | Uemura | F04B 27/1804 251/129.07 |
| 7,644,729 B2 | 1/2010 | Cho | F04B 27/1804 |
| 8,021,124 B2 | 9/2011 | Unemura et al. | |
| 9,181,937 B2 * | 11/2015 | Ota | F04B 27/1804 |
| 9,732,874 B2 * | 8/2017 | Saeki | F16K 31/0603 |
| 11,156,301 B2 | 10/2021 | Hayama et al. | F16K 11/105 |
| 2004/0060604 A1 | 4/2004 | Uemura et al. | 137/595 |
| 2006/0218953 A1 | 10/2006 | Hirota | 62/228.5 |
| 2009/0183786 A1 | 7/2009 | Iwa et al. | 137/487.5 |
| 2012/0056113 A1 * | 3/2012 | Tano | F04B 27/1804 251/25 |
| 2012/0198992 A1 | 8/2012 | Futakuchi et al. | 91/505 |
| 2013/0291963 A1 | 11/2013 | Futakuchi et al. | B60H 1/00485 |
| 2015/0211506 A1 | 7/2015 | Shirafuji et al. | F04B 27/1804 |
| 2015/0345655 A1 | 12/2015 | Higashidozono et al. | F16K 31/0624 |
| 2018/0363637 A1 | 12/2018 | Kanai et al. | F04B 27/1804 |
| 2020/0355282 A1 * | 11/2020 | Hayama | F16K 31/06 |
| 2021/0033082 A1 * | 2/2021 | Hayama | F16K 17/30 |

FOREIGN PATENT DOCUMENTS

| | | | |
|---|---|---|---|
| EP | 2 784 320 | 10/2014 | ............ F04B 27/18 |
| EP | 3 431 760 | 1/2019 | ............ F04B 27/18 |
| EP | 3744978 | 2/2020 | ............ F04B 27/18 |
| JP | 5-306679 | 11/1993 | ............ F04B 27/08 |
| JP | 05306679 A * | 11/1993 | |
| JP | 6-200875 | 7/1994 | ............ F04B 27/08 |
| JP | 2000-345961 | 12/2000 | ............ F04B 27/14 |
| JP | 2001-73939 | 3/2001 | ............ F04B 27/14 |
| JP | 2001-132632 | 5/2001 | ............ F04B 27/14 |
| JP | 2006-52648 | 2/2006 | ............ F04B 27/14 |
| JP | 2006-307828 | 11/2006 | ............ F04B 27/14 |
| JP | 4242624 | 1/2009 | ............ F04B 49/00 |
| JP | 4700048 | 3/2011 | ............ F04B 49/00 |
| JP | 5167121 | 12/2012 | ............ F04B 27/14 |
| JP | 5557901 | 6/2014 | ............ F04B 27/14 |
| JP | 2014-190247 | 10/2014 | ............ F04B 27/14 |
| JP | 2017-129042 | 7/2017 | ............ F04B 27/18 |
| JP | 6206274 | 10/2017 | ............ F04B 27/18 |
| JP | 2018-40385 | 3/2018 | ............ F16K 31/06 |
| JP | 2018040385 A * | 3/2018 | |
| WO | WO 2005095796 | 10/2005 | ............ F04B 27/14 |
| WO | WO 2007/119380 | 10/2007 | ............ F04B 27/14 |
| WO | WO 2014/091975 | 6/2014 | ............ F04B 27/14 |
| WO | WO 2014/119594 | 8/2014 | ............ F04B 27/14 |
| WO | WO 2017/057160 | 4/2017 | ............ F04B 27/18 |
| WO | WO 2017/159553 | 9/2017 | ............ F04B 27/18 |

OTHER PUBLICATIONS

International Search Report and Written Opinion issued in PCT/JP2019/005200, dated Apr. 23, 2019, with English translation, 12 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
European Search Report issued in corresponding European Patent Application Application Serial No. 19754335.8, dated Jun. 21, 2021, 11 pages.
European Search Report issued in corresponding European Patent Application No. 19754129.8, dated Jun. 18, 2021, 12 pages.
European Search Report issued in corresponding European Patent Application No. 19744514.1, dated Sep. 6, 2021, 9 pages.
Official Action issued in related U.S. Appl. No. 16/962,786, dated Jun. 24, 2021, 19 pages.
Notice of Allowance issued in related U.S. Appl. No. 16/962,786, dated Aug. 5, 2021, 4 pages.
U.S. Appl. No. 17/259,138, filed Jan. 8, 2021, Hayama et al.
U.S. Appl. No. 17/258,708, filed Jan. 7, 2021, Hayama et al.
U.S. Appl. No. 17/258,692, filed Jan. 7, 2021, Hayama et al.
U.S. Appl. No. 17/256,947, filed Dec. 29, 2020, Hayama et al.
U.S. Appl. No. 17/256,955, filed Dec. 29, 2020, Hayama et al.

(56) References Cited

OTHER PUBLICATIONS

U.S. Appl. No. 17/256,959, filed Dec. 29, 2020, Hayama et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/962,786, filed Jul. 16, 2020, Hayama et al.
European Search Report issued in corresponding European Patent Application Serial No. 19760096.8, dated Oct. 5, 2021, 9 pages.
Chinese Official Action issued in related Application Serial No. 201980012733.8, dated Sep. 2, 2021, with translation, 9 pages.
Chinese Official Action issued in related Application Serial No. 201980011652.6, dated Sep. 1, 2021, with translation, 10 pages.
Chinese Official Action issued in related Application Serial No. 201980011570.1, dated Sep. 3, 2021, with translation, 11 pages.
Korean Official Action issued in related Application Serial No. 10-2020-7024987, dated Sep. 17, 2021, with translation, 12 pages.
International Preliminary Report on Patentability issued in PCT/JP2019/002207, dated Jul. 28, 2020, 7 pages.
International Preliminary Report on Patentability issued in PCT/JP2019/005200, dated Aug. 18, 2020, 7 pages.
Chinese Official Action issued in related Application Serial No. 201980008650.1, dated Aug. 19, 2021, with translation, 8 pages.

\* cited by examiner

CAPACITY CONTROL VALVE

TECHNICAL FIELD

The present invention relates to a capacity control valve for variably controlling a capacity or a pressure of a working fluid and relates to, for example, a capacity control valve for controlling a discharge amount of a variable displacement compressor used in an air conditioning system of an automobile in response to a pressure.

BACKGROUND ART

A variable displacement compressor used in an air conditioning system of an automobile or the like includes a rotating shaft rotationally driven by an engine, a swash plate connected the rotating shaft so that an inclination angle is variable, a compression piston connected to the swash plate, and the like and changes the inclination angle of the swash plate so that a stroke amount of the piston is changed to control a discharge amount of a fluid. The inclination angle of the swash plate can be changed continuously by appropriately controlling a pressure inside a control chamber while using a suction pressure Ps of a suction chamber sucking a fluid by using a capacity control valve driven to be opened and closed by an electromagnetic force, a discharge pressure Pd of a discharge chamber discharging a fluid pressurized by the piston, and a control pressure Pc of the control chamber accommodating the swash plate (see Patent Citation 1).

When the variable displacement compressor is driven continuously (hereinafter, simply referred to as a "continuous driving state"), the capacity control valve is energized by a control computer and performs normal control in which a main valve element is moved in the axial direction by an electromagnetic force generated in a solenoid and a main valve is opened and closed to adjust the control pressure Pc by supplying a pressure of the discharge chamber to the control chamber.

During normal control of the capacity control valve, the pressure of the control chamber of the variable displacement compressor is appropriately controlled and the inclination angle of the swash plate with respect to the rotating shaft is continuously changed to change the stroke amount of the piston so that the discharge amount of the fluid with respect to the discharge chamber is controlled and the air conditioning system is adjusted to have desired cooling capacity. Further, when the variable displacement compressor is driven with a maximum capacity, the main valve of the capacity control valve is closed and the pressure of the control chamber is decreased so that the inclination angle of the swash plate is maximized.

CITATION LIST

Patent Literature

Patent Citation 1: JP 4700048 B2 (Page 8, FIG. 2)

SUMMARY OF INVENTION

Technical Problem

However, in Patent Citation 1, when the variable displacement compressor is driven with a maximum capacity, the main valve of the capacity control valve is closed. However, since the control chamber and the suction chamber are only communicated with each other by a fixed orifice whose flow rate is almost negligible in normal control, the pressure of the control chamber cannot be promptly and sufficiently decreased and the maximum capacity state of the control chamber cannot be maintained. As a result, there is concern that operation efficiency decreases.

The present invention has been made in view of such problems and an object of the present invention is to provide a capacity control valve having good operation efficiency.

Solution to Problem

In order to solve the foregoing problems, a capacity control valve according to the present invention includes: a valve housing provided with a Pc port, a Pd port, a first Ps port and a second Ps port; a main valve element which includes a main valve portion capable of coming into contact with and separating from a main valve seat to close and open a communication between the Pd port and the Pc port by a drive force of a solenoid; an intermediate communication path that communicates with the Pc port and the first Ps port; a pressure-sensitive valve which is able to open and close the intermediate communication path by an ambient pressure; and a differential pressure valve including a differential pressure valve element and being capable of opening and closing a communication between the Pc port and the second Ps port and a communication between the Pc port and a pressure-sensitive chamber by the differential pressure valve element moved by a pressure. According to the aforesaid feature, since the differential pressure valve is opened so as to allow the communication between the Pc port and the second Ps port in the energized state, the control pressure and the suction pressure can be maintained at the equal pressure (i.e., at the same pressure). In this way, the operation efficiency of the variable displacement compressor can be increased.

It is preferable that when the differential pressure valve element moves in a valve opening direction, the communication between the Pc port and the second Ps port is opened and the communication between the Pc port and the pressure-sensitive chamber is closed. According to this preferable configuration, since both the Pc port and the second Ps port are interrupted with respect to the pressure-sensitive chamber and the communication between the Pc port and the second Ps port is not performed by using the pressure-sensitive chamber when the Pc port communicates with the second Ps port, the control pressure and the suction pressure can be reliably maintained at the equal pressure (i.e., at the same pressure).

It is preferable that the differential pressure valve element is formed in a cylindrical shape and is provided concentrically on an outer radial side of the pressure-sensitive valve. According to this preferable configuration, the capacity control valve with the differential pressure valve can be made compact.

It is preferable that the capacity control valve further includes a spring configured to urge the differential pressure valve element in a valve opening direction. According to this preferable configuration, when the differential pressure is small, the differential pressure valve element can be reliably moved to the valve closing position.

It is preferable that the differential pressure valve element is provided with a Pc pressure receiving surface receiving a pressure from the pressure-sensitive chamber and a Ps pressure receiving surface receiving a pressure from the second Ps port, the Pc pressure receiving surface and the Ps pressure receiving surface being opposite to each other.

According to this preferable configuration, since the Pc pressure receiving surface is opposite to the Ps pressure receiving surface, the inclination of the differential pressure valve element is difficult and the differential pressure valve element can be smoothly moved.

It is preferable that the capacity control valve further includes a sealing member formed in an annular shape and disposed between an outer peripheral surface of the differential pressure valve element and an inner peripheral surface of the valve housing and the differential pressure valve element is provided so as to be slidable on the sealing member. According to this preferable configuration, the differential pressure valve can have a simple configuration.

It is preferable that when the differential pressure valve element is urged in the valve opening direction of the differential pressure valve, the differential pressure valve element comes into contact with an inner surface of the valve housing. to this preferable configuration, the differential pressure valve can have a simple configuration.

It is preferable that when the differential pressure valve element is urged in a valve closing direction of the differential pressure valve, the differential pressure valve element comes into contact with the inner surface of the valve housing. According to this preferable configuration, the differential pressure valve can have a simple configuration.

DESCRIPTION OF EMBODIMENTS

Modes for carrying out a capacity control valve according to the present invention will be described below on the basis of embodiments.

First Embodiment

A capacity control valve according to a first embodiment of the present invention will be described with reference to FIGS. 1 to 6. Hereinafter, the left and right sides as viewed from the front side in FIG. 2 will be described as the left and right sides of the capacity control valve.

A capacity control valve V of the present invention is incorporated in a variable displacement compressor M used in an air conditioning system of an automobile or the like and variably controls a pressure of a working fluid (hereinafter, simply referred to as a "fluid") which is a refrigerant so that a discharge amount of the variable displacement compressor M is controlled to adjust the air conditioning system to a desired cooling capacity.

Figure 1:
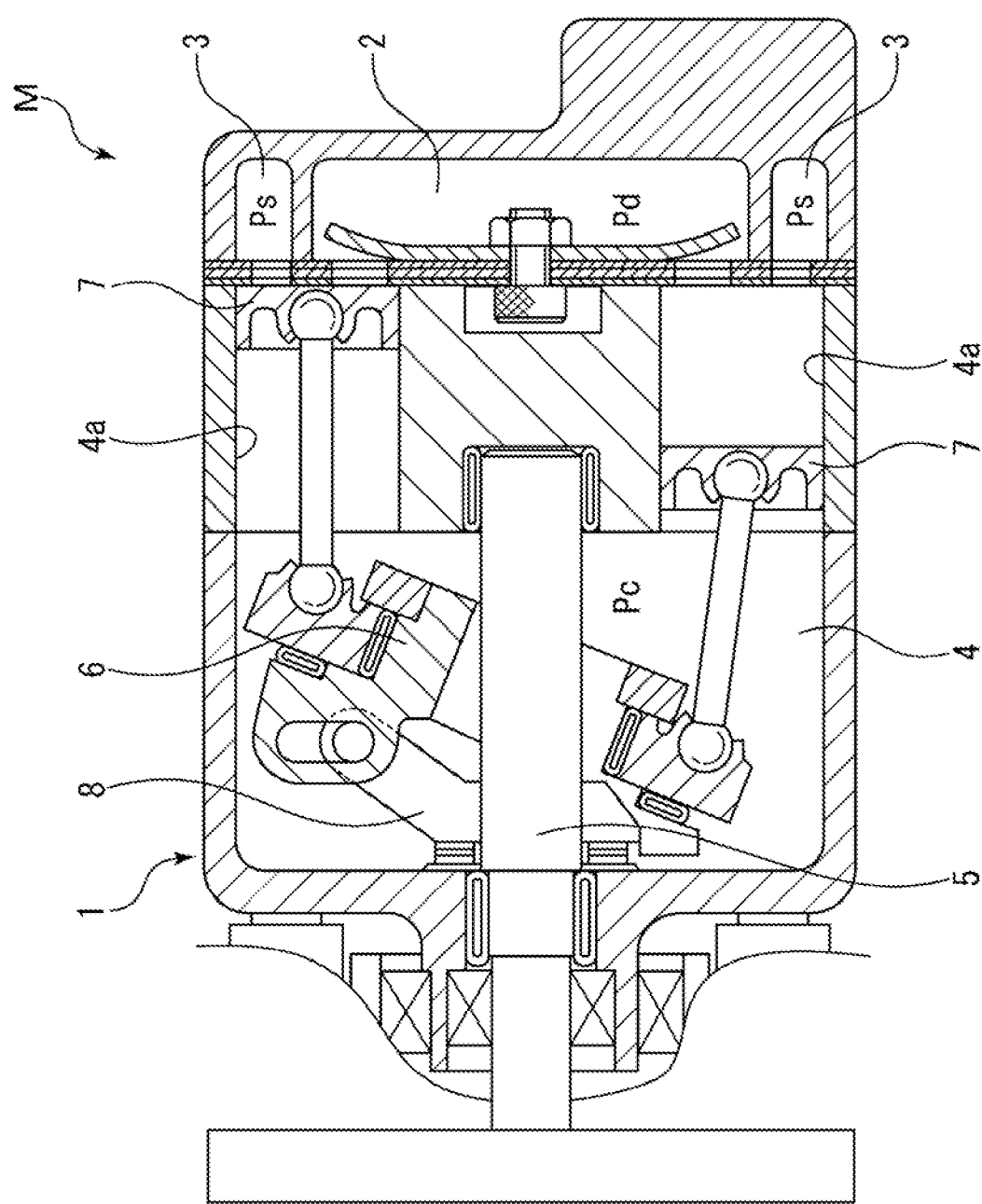
FIG. 1 is a schematic configuration diagram illustrating a swash plate type variable displacement compressor incorporated with a capacity control valve according to a first embodiment of the present invention.

First, the variable displacement compressor M will be described. As illustrated in FIG. 1, the variable displacement compressor M includes a casing 1 having a discharge chamber 2, a suction chamber 3, a control chamber 4, and a plurality of cylinders 4a. In addition, the variable displacement compressor M is provided with a communication path (not illustrated) allowing the control chamber 4 and the suction chamber 3 to directly communicate with each other and this communication path is provided with a fixed orifice for adjusting a pressure between the suction chamber 3 and the control chamber 4 in a balanced state.

Further, the variable displacement compressor M includes a rotating shaft 5 which is rotationally driven by an engine (not illustrated) installed outside the casing 1, a swash plate 6 which is eccentrically connected to the rotating shaft 5 inside the control chamber 4 by a hinge mechanism 8, and a plurality of pistons 7 which are connected to the swash plate 6 and are fitted so as to be movable in a reciprocating manner inside the respective cylinders 4a and continuously changes an inclination angle of the swash plate 6 by appropriately controlling a pressure inside the control chamber 4 while using a suction pressure Ps of the suction chamber 3 sucking a fluid by using the capacity control valve V driven to be opened and closed by an electromagnetic force, a discharge pressure Pd of the discharge chamber 2 discharging a fluid pressurized by the piston 7, and a control pressure Pc of the control chamber 4 accommodating the swash plate 6 so that a stroke amount of the piston 7 is changed to control a discharge amount of the fluid. Further, for convenience of description, the capacity control valve V incorporated in the variable displacement compressor M is omitted in FIG. 1.

Specifically, the inclination angle of the swash plate 6 with respect to the rotating shaft 5 becomes smaller so that the stroke amount of the piston 7 decreases as the control pressure Pc inside the control chamber 4 becomes higher. However, when the pressure becomes a certain level or more, the swash plate 6 is substantially perpendicular to the rotating shaft 5 (slightly inclined from the vertical direction). At this time, since the stroke amount of the piston 7 is minimized and the pressurization of the fluid inside the cylinder 4a by the piston 7 is minimized, the discharge amount of the fluid to the discharge chamber 2 decreases and the cooling capacity of the air conditioning system is minimized. On the other hand, the inclination angle of the swash plate 6 with respect to the rotating shaft 5 becomes larger so that the stroke amount of the piston 7 increases as the control pressure Pc inside the control chamber 4 becomes lower. However, when the pressure becomes a certain level or less, the inclination angle of the swash plate 6 with respect to the rotating shaft 5 is maximized. At this time, since the stroke amount of the piston 7 is maximized and the pressurization of the fluid inside the cylinder 4a by the piston 7 is maximized, the discharge amount of the fluid to the discharge chamber 2 increases and the cooling capacity of the air conditioning system is maximized.

Figure 2:
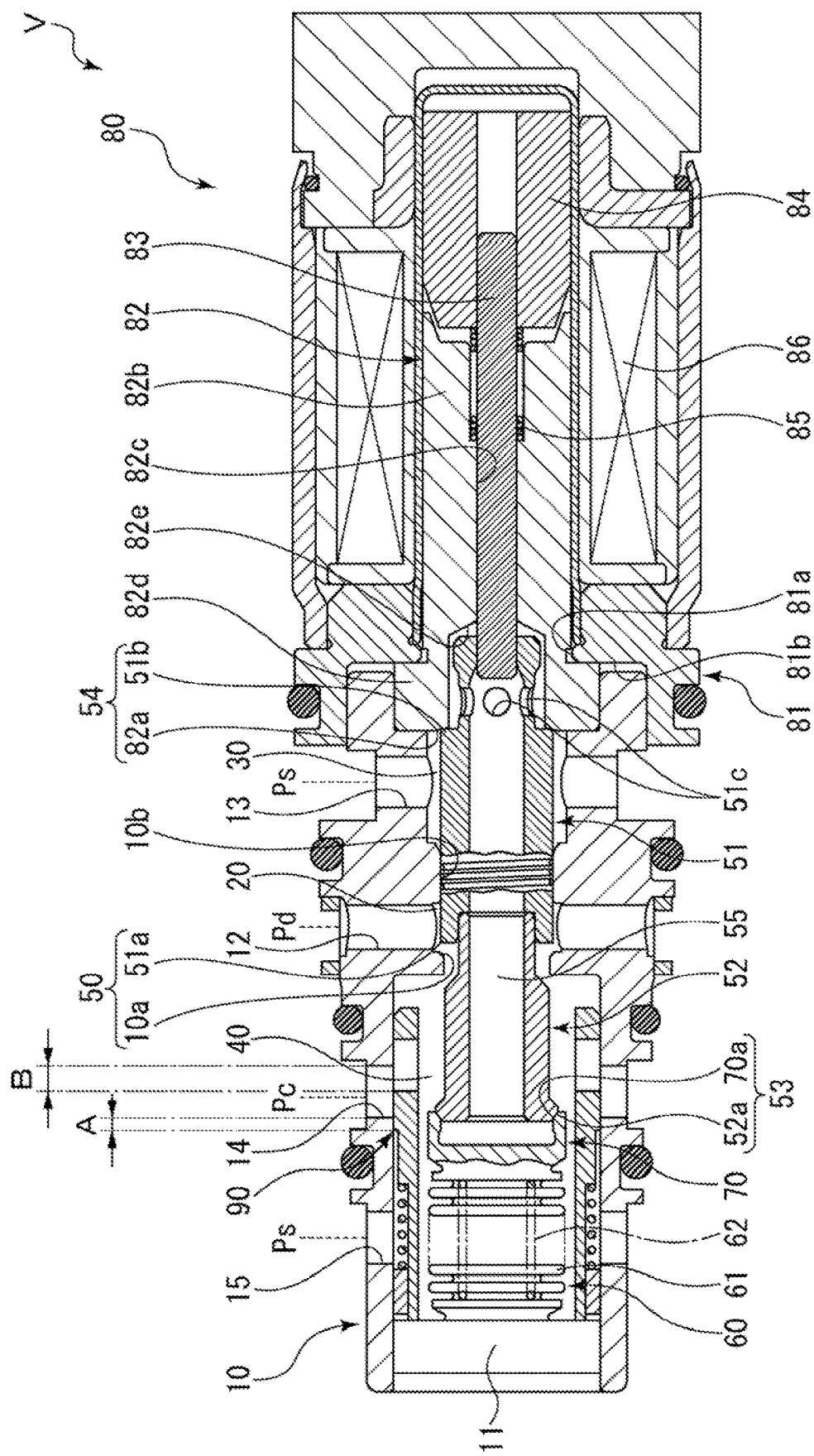
FIG. 2 is a cross-sectional view illustrating a state in which a first valve is opened and a differential pressure valve is closed when the capacity control valve according to the first embodiment is not energized.

As illustrated in FIG. 2, the capacity control valve V incorporated in the variable displacement compressor M adjusts a current flowing through a coil 86 constituting a solenoid 80 so as to control the opening and closing of a first valve 50 and a second valve 54 which are main valves of the capacity control valve V and to control the opening and closing of a pressure-sensitive valve 53 by an ambient fluid pressure so that the fluid flowing into the control chamber 4 or flowing out from the control chamber 4 is controlled to variably control the control pressure Pc inside the control chamber 4.

In the present embodiment, the first valve 50 includes a main valve element 51 and a first valve seat 10a which is a main valve seat formed on an inner peripheral surface of a valve housing 10 and a first valve portion 51a which is a main valve portion formed in a left axial end of the main valve element 51 comes into contact with and separates from the first valve seat 10a. The second valve 54 includes the main valve element 51 and a second valve seat 82a formed in the left axial end surface corresponding to the opening end surface of the fixed iron core 82 and a second valve portion 51b formed in the right axial end of the main valve element 51 comes into contact with and separates from the second valve seat 82a. The pressure-sensitive valve 53 includes an adapter 70 of the pressure-sensitive element 60 and a pressure-sensitive valve seat 52a formed in the left axial end portion of the pressure-sensitive valve member 52 and a right axial end 70a of the adapter 70 comes into contact with and separates from the pressure-sensitive valve seat 52a.

Next, a structure of the capacity control valve V will be described. As illustrated in FIG. 2, the capacity control valve V mainly includes the valve housing 10 which is formed of a metal material or a resin material, the main valve element 51 and the pressure-sensitive valve member 52 which are disposed so as to be movable in a reciprocating manner in the axial direction in the valve housing 10, the pressure-sensitive element 60 which applies an urging force to the main valve element 51 and the pressure-sensitive valve member 52 rightward in the axial direction in response to an ambient fluid pressure, the solenoid 80 which is connected to the valve housing 10 and applies a drive force to the main valve element 51 and the pressure-sensitive valve member 52, and a differential pressure valve 90 which is concentrically disposed on the outer radial side of the pressure-sensitive element 60. In the present embodiment, the differential pressure valve 90 includes a differential pressure valve portion 91a which is formed in an outer peripheral surface of a differential pressure valve element 91 (a sliding portion 91e) to be described later and a differential pressure valve seat 10c which is formed in the inner peripheral surface of the valve housing 10 to be described later (see FIGS. 3 to 6).

As illustrated in FIG. 2, the solenoid 80 mainly includes a casing 81 which has an opening portion 81a opening leftward in the axial direction, a substantially cylindrical fixed iron core 82 which is inserted into the opening portion 81a of the casing 81 from the left side in the axial direction and is fixed to the inner radial side of the casing 81, a drive rod 83 which is fixed to the inner radial side of the fixed iron core 82 so as to be movable in a reciprocating manner in the axial direction and of which a left axial end portion is connected and fixed to the main valve element 51, a movable iron core 84 which is fixed to a right axial end portion of the drive rod 83, a coil spring 85 which is provided between the fixed iron core 82 and the movable iron core 84 and urges the movable iron core 84 rightward in the axial direction, and an excitation coil 86 which is wound on the outside of the fixed iron core 82 through a bobbin.

The casing 81 is provided with a concave portion 81b which is recessed rightward in the axial direction from the radial center of the left axial end and the right axial end portion of the valve housing 10 is inserted and fixed to the concave portion 81b.

The fixed iron core 82 includes a cylindrical portion 82b which is formed of a rigid body corresponding to a magnetic material such as iron or silicon steel and is provided with an insertion hole 82c extending in the axial direction and allowing the drive rod 83 to be inserted therethrough and an annular flange portion 82d which extends outward in the radial direction from the outer peripheral surface of the left axial end portion of the cylindrical portion 82b and a concave portion 82e is formed so as to be recessed rightward in the axial direction from the radial center of the left axial end of the cylindrical portion 82b.

As illustrated in FIG. 2, the valve housing 10 has a substantially cylindrical shape with a bottom by press-inserting a partition adjustment member 11 corresponding to a valve housing into the left axial end portion. The main valve element 51 and the pressure-sensitive valve member 52 are disposed inside the valve housing 10 so as to be movable in a reciprocating manner in the axial direction and a guide surface 10b having a small diameter and slidable in the outer peripheral surface of the main valve element 51 is formed in a part of the inner peripheral surface of the valve housing 10. In addition, the partition adjustment member 11 can adjust the urging force of the pressure-sensitive element 60 by adjusting the installation position of the valve housing 10 in the axial direction.

Further, a first valve chamber 20 in which the side of the first valve portion 51a of the main valve element 51 is disposed, a second valve chamber 30 which is formed on the right axial side corresponding to the back pressure side of the main valve element 51, and a pressure-sensitive chamber 40 which is formed at a position opposite to the second valve chamber 30 with respect to the first valve chamber 20 are formed inside the valve housing 10. In addition, the second valve chamber 30 is defined by the outer peripheral surface on the back pressure side of the main valve element 51, the concave portion 82e and the left axial end surface corresponding to the opening end surface of the fixed iron core 82, and the inner peripheral surface on the right axial side in relation to the guide surface 10b of the valve housing 10.

Further, the valve housing 10 is provided with a Pd port 12 which communicates the first valve chamber 20 with the discharge chamber 2 of the variable displacement compressor M, a first Ps port 13 which communicates the second valve chamber 30 with the suction chamber 3 of the variable displacement compressor M, a Pc port 14 which communicates the pressure-sensitive chamber 40 with the control chamber 4 of the variable displacement compressor M, and a second Ps port 15 which is adjacent to the left axial side of the Pc port 14 and communicates the pressure-sensitive chamber 40 with the suction chamber 3 of the variable displacement compressor M.

As illustrated in FIG. 2, the main valve element 51 is formed in a substantially cylindrical shape, the pressure-sensitive valve member 52 having a substantially cylindrical shape and a substantially turret shape in the side view is connected and fixed to the left axial end portion, the drive rod 83 is connected and fixed to the right axial end portion, and these components are moved in the axial direction together. Further, an intermediate communication path 55 which penetrates in the axial direction by connecting hollow holes is formed inside the main valve element 51 and the pressure-sensitive valve member 52. In addition, the intermediate communication path 55 communicates with the second valve chamber 30 through a plurality of through-holes 51c penetrating the right axial end portion of the main valve element 51 in the radial direction.

As illustrated in FIG. 2, the pressure-sensitive element 60 mainly includes the bellows core 61 in which the coil spring 62 is embedded and the adapter 70 which is formed in the right axial end portion of the bellows core 61 and the left axial end of the bellows core 61 is fixed to the partition adjustment member 11.

Further, the pressure-sensitive element 60 is disposed inside the pressure-sensitive chamber 40 and the right axial end 70a of the adapter 70 sits on the pressure-sensitive valve seat 52a of the pressure-sensitive valve member 52 by the urging force of the coil spring 62 and the bellows core 61. In addition, the pressure-sensitive element 60 contracts by an ambient fluid pressure when the suction pressure Ps inside the intermediate communication path 55 is high and the pressure-sensitive valve 53 is opened by operating the right axial end 70a of the adapter 70 to be separated from the pressure-sensitive valve seat 52a of the pressure-sensitive valve member 52 (see FIG. 3). Accordingly, for example, when the suction pressure Ps inside the second valve chamber 30 is high, the control pressure Pc can be promptly released to the second valve chamber 30 through the intermediate communication path 55 and the through-hole 51c of the main valve element 51.

As illustrated in FIGS. 3 to 6, the differential pressure valve element 91 has a substantially cylindrical shape and is disposed concentrically on the outer radial side of the pressure-sensitive element 60 inside the pressure-sensitive chamber 40. Further, a coil spring 92 which is a spring is externally fitted to an attachment portion 91c having a small diameter and formed in the left axial end portion of the differential pressure valve element 91, the left axial end of the coil spring 92 comes into contact with a right axial end surface of an annular sealing member 93 fixed to a left axial position in relation to the second Ps port 15 in the inner peripheral surface of the valve housing 10, and the right axial end of the coil spring 92 comes into contact with a side surface 91g which is a Ps pressure receiving surface extending in the radial direction of the right axial end of the attachment portion 91c. In addition, the outer periphery of the coil spring 92 is separated from the inner peripheral surface of the valve housing 10 in the radial direction. Further, the spring constant of the coil spring 92 is set to be smaller than that of the coil spring 62 provided in the pressure-sensitive element 60.

The sealing member 93 is formed of PTFE and seals a gap between the inner peripheral surface of the valve housing 10 and the outer peripheral surface of the attachment portion 91c in the circumferential direction, the inner peripheral surface of the sealing member 93 and the outer peripheral surface of the attachment portion 91c are slightly separated from each other in the radial direction so as to form a minute gap therebetween, and the differential pressure valve element 91 can be smoothly moved in the axial direction.

Specifically, the differential pressure valve element 91 includes a base portion 91b which has a substantially cylindrical shape or a stepped shape in cross-section, the attachment portion 91c which is formed in the left axial end portion of the base portion 91b and has a small diameter, a flow path portion 91m which is formed at the center of the base portion 91b in the axial direction and has a diameter larger than that of the attachment portion 91c, the sliding portion 91e which is formed in the right axial end portion of the base portion 91b and has a diameter larger than that of the flow path portion 91m, and a through-hole 91d which is formed at the substantially center of the sliding portion 91e in the axial direction so as to penetrate therethrough in the radial direction and is urged rightward in the axial direction corresponding to the valve opening direction of the differential pressure valve 90 by the coil spring 92 externally fitted to the attachment portion 91c. In addition, the outer peripheral surface of the sliding portion 91e and the inner peripheral surface of the valve housing 10 are slightly separated from each other in the radial direction so as to form a minute gap therebetween and the differential pressure valve element 91 can be smoothly moved in the axial direction.

Further, since the left axial end of the differential pressure valve element 91, that is, the left axial end of the attachment portion 91c is provided with an end surface portion 91f which comes into contact with the right axial end surface 11a of the partition adjustment member 11 when closing the differential pressure valve 90 and the right axial end of the differential pressure valve element 91, that is, the right axial end of the sliding portion 91e is provided with an end surface portion 91h which can come into contact with the inner surface of the valve housing 10 (the pressure-sensitive chamber 40) when opening the differential pressure valve 90, the axial position of the differential pressure valve element 91 when opening and closing the differential pressure valve 90 is determined.

Further, the left axial end portion of the outer peripheral surface of the sliding portion 91e is provided with the differential pressure valve portion 91a which slides on the differential pressure valve seat 10c formed in the inner peripheral surface of the valve housing 10 on the left axial side in relation to the Pc port 14 in the range of the axial dimension A (see FIG. 2).

Further, the through-hole 91d formed in the sliding portion 91e has substantially the same opening area as the Pc port 14 formed in the valve housing 10. In a state in which the differential pressure valve 90 is closed (that is, the end surface portion 91f of the left axial end of the attachment portion 91c comes into contact with the right axial end surface 11a of the partition adjustment member 11), a substantially half of the left axial side of the opening of the through-hole 91d and a substantially half of the right axial side of the opening of the Pc port 14 overlap each other in the range of the axial dimension B (see FIG. 2) and the pressure-sensitive chamber 40 communicates with the control chamber 4 by the through-hole 91d and the Pc port 14 (see FIG. 5). On the other hand, in a state in which the differential pressure valve 90 is opened (that is, the end surface portion 91h of the right axial end of the sliding portion 91e comes into contact with the inner surface of the valve housing 10 (in the pressure-sensitive chamber 40)), the through-hole 91d is closed by the inner peripheral surface of the valve housing 10 on the right axial side in relation to the Pc port 14 (see FIGS. 3 and 4).

In addition, in the present embodiment, the axial dimension and the formation position of the sliding portion 91e and the flow path portion 91m of the differential pressure valve element 91 are formed so that the axial dimension B in which the openings of the through-hole 91d and the Pc port 14 overlap each other is larger than the axial dimension A of the differential pressure valve portion 91a sliding on the differential pressure valve seat 10c of the valve housing 10 (i.e., A<B).

Further, since the capacity control valve V has a structure in which the pressure-sensitive element 60, the differential pressure valve element 91, and the coil spring 92 are inserted from the left axial end of the valve housing 10 into the pressure-sensitive chamber 40, the sealing member 93 is fixed to the inner peripheral surface of the valve housing 10, and the partition adjustment member 11 is press-inserted so as to fix the entire part, the assembly is simple. In addition, the sealing member 93 may be integrally formed with the partition adjustment member 11.

Next, an opening and closing mechanism of the differential pressure valve 90 will be described. Since the pressure receiving areas of the control pressure Pc and the suction pressure Ps respectively applied to the right axial side corresponding to the valve opening direction of the differential pressure valve 90 and the left axial side corresponding to the valve closing direction thereof are substantially the same in the differential pressure valve element 91 disposed inside the pressure-sensitive chamber 40 in a state in which the control pressure Pc and the suction pressure Ps applied to both sides of the differential pressure valve element 91 in the axial direction are balanced (i.e., Pc=Ps), the pressure applied to the differential pressure valve element 91 from both sides in the axial direction is balanced. When the differential pressure valve element 91 moves rightward in the axial direction by receiving the urging force of the coil spring 92 and the differential pressure valve portion 91a is separated from the differential pressure valve seat 10c, the differential pressure valve 90 is opened (see FIGS. 3 and 4). In addition, in the differential pressure valve element 91, a pressure receiving surface (that is, the side surface 91g extending in the radial direction of the right axial end of the attachment portion 91c and a side surface 91k corresponding to the Ps pressure receiving surface extending in the radial direction of the left axial end of the sliding portion 91e) for the suction pressure Ps applied to the right axial side corresponding to the valve opening direction of the differential pressure valve 90 is opposite to a pressure receiving surface (for example, the end surface portion 91h corresponding to the Pc pressure receiving surface of the right axial end of the sliding portion 91e) for the control pressure Pc applied to the left axial side corresponding to the valve closing direction in the axial direction.

On the other hand, in a state in which the suction pressure Ps of the suction chamber 3 is lower than the control pressure Pc of the control chamber 4 (or the pressure-sensitive chamber 40) (i.e., Pc>Ps), a pressure (i.e., the control pressure Pc and the suction pressure Ps) applied to the differential pressure valve element 91 from the left axial side becomes smaller than a pressure (i.e., only the control pressure Pc) applied from the right axial side, that is, a differential pressure is generated in the axial direction. Then, a force (indicated by a white arrow in FIGS. 5 and 6) is applied to the differential pressure valve element 91 to the left axial side so that the differential pressure valve element 91 moves to the left axial side against the urging force of the coil spring 92 and the differential pressure valve 90 is closed (see FIG. 5).

Next, a case in which the non-energized state of the capacity control valve V is maintained will be described. As illustrated in FIG. 2, when the capacity control valve V is in the non-energized state, the movable iron core 84 is pressed to the right axial side by the urging force of the coil spring 85 constituting the solenoid 80 or the urging force of the coil spring 62 and the bellows core 61, the drive rod 83, the main valve element 51, and the pressure-sensitive valve member 52 move the right axial side, the second valve portion 51b of the main valve element 51 sits on the second valve seat 82a of the fixed iron core 82 so as to close the second valve 54, and the first valve portion 51a of the main valve element 51 is separated from the first valve seat 10a formed in the inner peripheral surface of the valve housing 10 so as to open the first valve 50.

In this way, when the capacity control valve V is in the non-energized state, a fluid inside the discharge chamber 2 of the variable displacement compressor M flows from the discharge chamber 2 into the control chamber 4 through the capacity control valve V when the first valve 50 is opened. This is because the discharge pressure Pd is higher than the control pressure Pc.

Since the discharge pressure Pd flows into the control chamber 4, the control pressure Pc is higher than the control pressure Pc before the non-energized state, is higher than the suction pressure Ps, and is expressed by a relational expression of Pd≥Pc>Ps. For that reason, a fluid inside the control chamber 4 flows into the suction chamber 3 through the communication path and the fixed orifice directly communicating the control chamber 4 with the suction chamber 3. The inflow of the fluid is performed until the discharge pressure Pd, the suction pressure Ps, and the control pressure Pc are equalized. For that reason, when the capacity control valve V is left in the non-energized state for a long time, the discharge pressure Pd, the suction pressure Ps, and the control pressure Pc are equalized (i.e., Pd=Pc=Ps) and the suction pressure Ps and the control pressure Pc are much higher than the pressure in the continuous driving state. At this time, a part of the fluid inside the control chamber 4 is liquefied. In addition, since the control pressure Pc of the control chamber 4 and the suction pressure Ps of the suction chamber 3 are balanced and equalized, the control pressure Pc applied to the differential pressure valve element 91 disposed inside the pressure-sensitive chamber 40 from both sides in the axial direction is balanced. Accordingly, the differential pressure valve element 91 moves rightward in the axial direction by the urging force of the coil spring 92 so that the differential pressure valve 90 is opened. Further, since the pressure-sensitive element 60 contracts by the suction pressure Ps which is much higher than that of the continuous driving state, the right axial end 70a of the adapter 70 is separated from the pressure-sensitive valve seat 52a of the pressure-sensitive valve member 52 so that the pressure-sensitive valve 53 is opened (see FIG. 3).

Next, a case until a liquefied fluid is discharged from the control chamber 4 when starting the variable displacement compressor M will be described.

When the coil 86 of the solenoid 80 is energized and excited to generate a magnetic force from the non-energized state of the capacity control valve V (i.e., a state in which the first valve 50 is opened) illustrated in FIG. 2, the main valve element 51 moves leftward in the axial direction so that the first valve portion 51a of the main valve element 51 sits on the first valve seat 10a formed in the inner peripheral surface of the valve housing 10 and the first valve 50 is closed.

Figure 3:
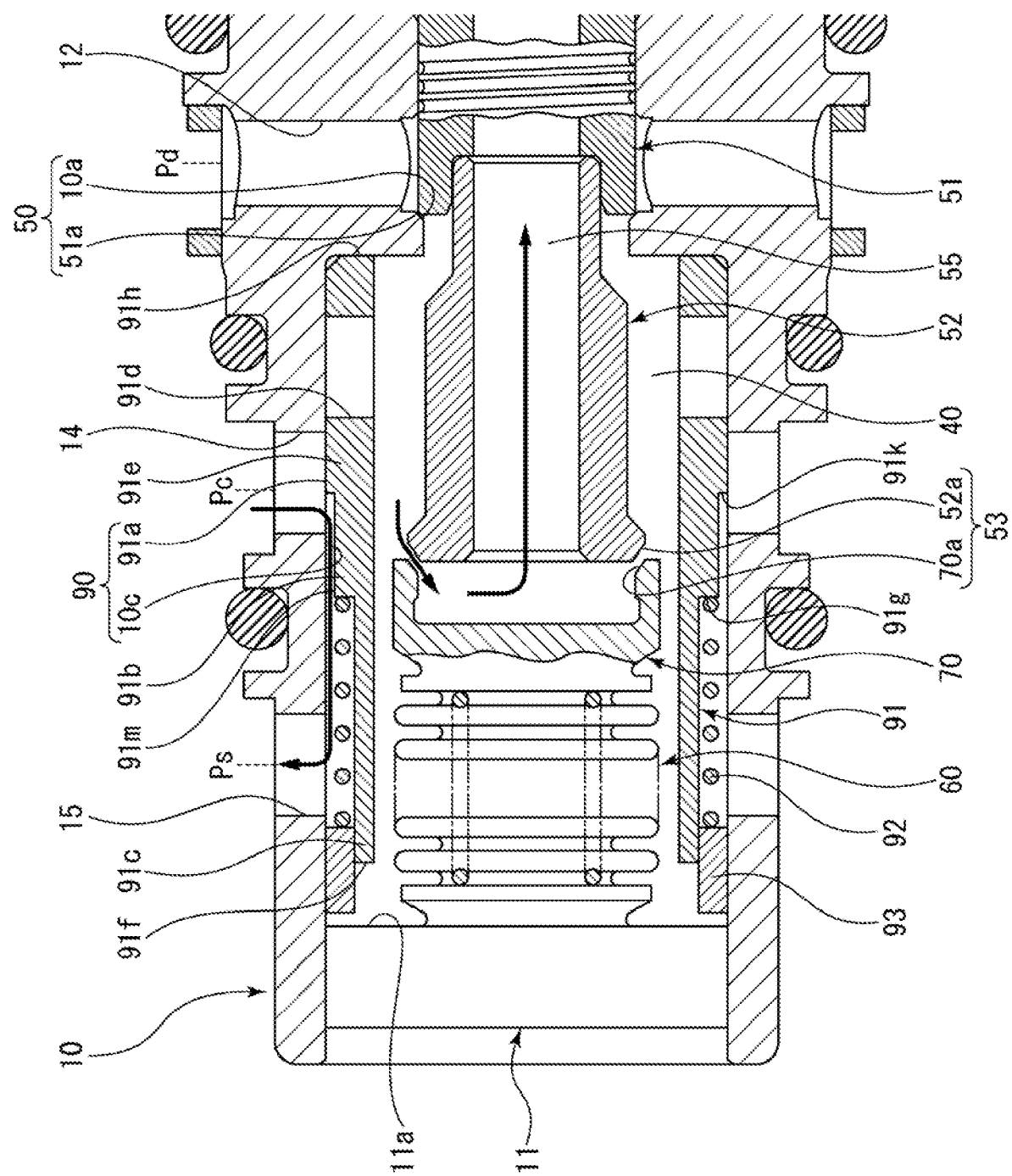
FIG. 3 is an enlarged cross-sectional view illustrating a state in which a first valve is closed and a pressure-sensitive valve and a differential pressure valve are opened when the capacity control valve according to the first embodiment is energized (e.g., started).

Further, since the suction pressure Ps of the suction chamber 3 slightly decreases due to the stroke of the piston 7 when starting the variable displacement compressor M, a pressure difference between the control pressure Pc of the control chamber 4 and the suction pressure Ps of the suction chamber 3 generates a flow of a fluid flowing from the Pc port 14 to the second Ps port 15 through the differential pressure valve 90 and a flow of a fluid flowing from the inside of the pressure-sensitive chamber 40 to the intermediate communication path 55 through the pressure-sensitive valve 53 and flowing to the first Ps port 13 (see FIG. 3).

Accordingly, in the capacity control valve V of the present embodiment, since it is possible to discharge a liquefied refrigerant of the control chamber 4 by opening the differential pressure valve 90 so as to allow the communication of the differential pressure communication path from the Pc port 14 to the second Ps port 15 (as indicated by a solid arrow in FIG. 3) when starting the variable displacement compressor M, it is possible improve responsiveness during start-up by discharging the liquefied fluid through the differential pressure valve 90 in a short time. Further, the liquefied refrigerant of the pressure-sensitive chamber 40 is discharged to the first Ps port 13 through the pressure-sensitive valve 53. In addition, since the liquefied refrigerant of the pressure-sensitive chamber 40 is discharged and the control pressure Pc and the suction pressure Ps decrease, the pressure-sensitive valve 53 is closed (see FIG. 4).

Figure 4:
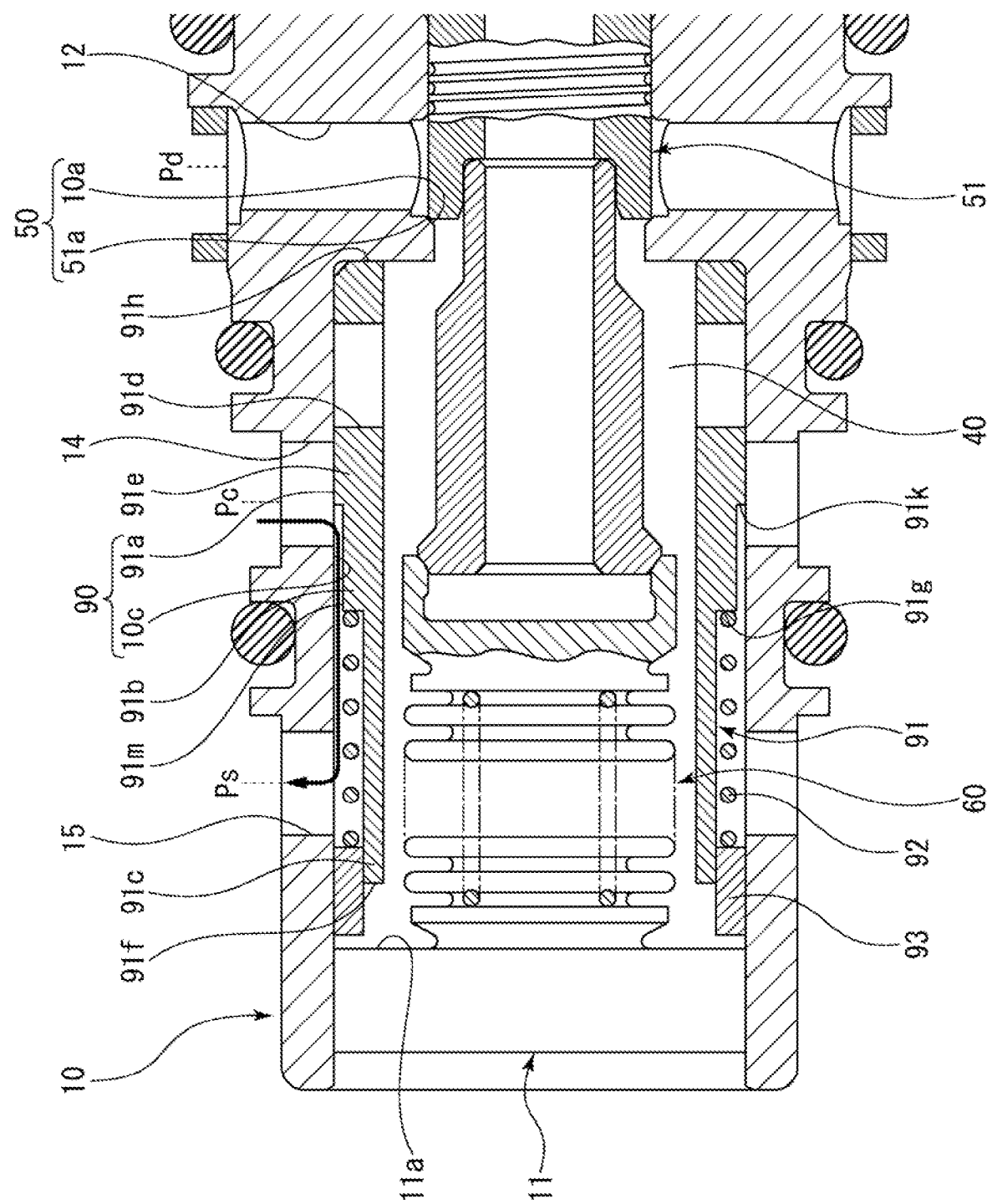
FIG. 4 is an enlarged cross-sectional view illustrating a state in which a first valve is closed and a differential pressure valve is opened when the capacity control valve according to the first embodiment is energized (e.g., during normal control).

Next, the case of the normal control of the capacity control valve V in the continuous driving state of the variable displacement compressor M will be described. Here, the case of performing the normal control from the state in which the control pressure Pc and the suction pressure Ps are balanced and the control chamber 4 has a maximum capacity will be described. As illustrated in FIG. 4, when the capacity control valve V is in the maximum capacity state, the coil 86 of the solenoid 80 is energized and excited so as to generate a magnetic force, the movable iron core 84 is sucked to the fixed iron core 82 that receives the magnetic force, the drive rod 83 of which the right axial end portion is connected to the movable iron core 84 moves in a following manner, the main valve element 51 connected to the left axial end portion of the drive rod 83 moves leftward in the axial direction, and the main valve element 51 and the pressure-sensitive valve member 52 move leftward in the axial direction together.

Accordingly, in the capacity control valve V, the first valve portion 51a of the main valve element 51 sits on the first valve seat 10a formed in the inner peripheral surface of the valve housing 10 so that the first valve 50 is closed. At this time, the second valve portion 51b of the main valve element 51 is separated from the second valve seat 82a formed in the opening end surface of the fixed iron core 82 so that the second valve 54 is opened. Further, since the control pressure Pc and the suction pressure Ps are balanced (i.e., Pc=Ps) in the maximum capacity state, the differential pressure valve element 91 receives the urging force of the coil spring 92 and moves rightward in the axial direction so that the differential pressure valve portion 91a is separated from the differential pressure valve seat 10c and the differential pressure valve 90 is opened.

Accordingly, in the capacity control valve V of the present embodiment, when the differential pressure valve 90 is opened, the differential pressure communication path allows the communication from the Pc port 14 to the second Ps port 15, the through-hole 91d of the differential pressure valve element 91 is closed, and both the Pc port 14 and the second Ps port 15 are interrupted with respect to the pressure-sensitive chamber 40. In this way, since the communication between the Pc port 14 and the second Ps port 15 by the differential pressure communication path is not performed through the pressure-sensitive chamber 40, the control pressure Pc and the suction pressure Ps can be easily maintained at the equal pressure (i.e., at the same pressure). For this reason, since the stroke of the piston 7 inside the cylinder 4a of the control chamber 4 is stabilized and the maximum capacity state is maintained, the operation efficiency can be increased. Here, both the differential pressure valve 90 and the pressure-sensitive valve 53 are opened by the differential pressure between the control pressure Pc and the suction pressure Ps, but the differential pressure valve 90 is set to be operated at the differential pressure smaller than that of the pressure-sensitive valve 53.

Further, since the pressure-sensitive element 60 expands when the suction pressure Ps decreases in the maximum capacity state, the right axial end 70a of the adapter 70 sits on the pressure-sensitive valve seat 52a of the pressure-sensitive valve member 52. Accordingly, since the differential pressure valve 90 is opened so as to allow the communication of the differential pressure communication path from the Pc port 14 to the second Ps port 15 (as indicated by a solid arrow in FIG. 4) even when the suction pressure Ps is low and the pressure-sensitive valve 53 is not opened, the control pressure Pc and the suction pressure Ps can be maintained at the equal pressure (i.e., at the same pressure).

Figure 5:
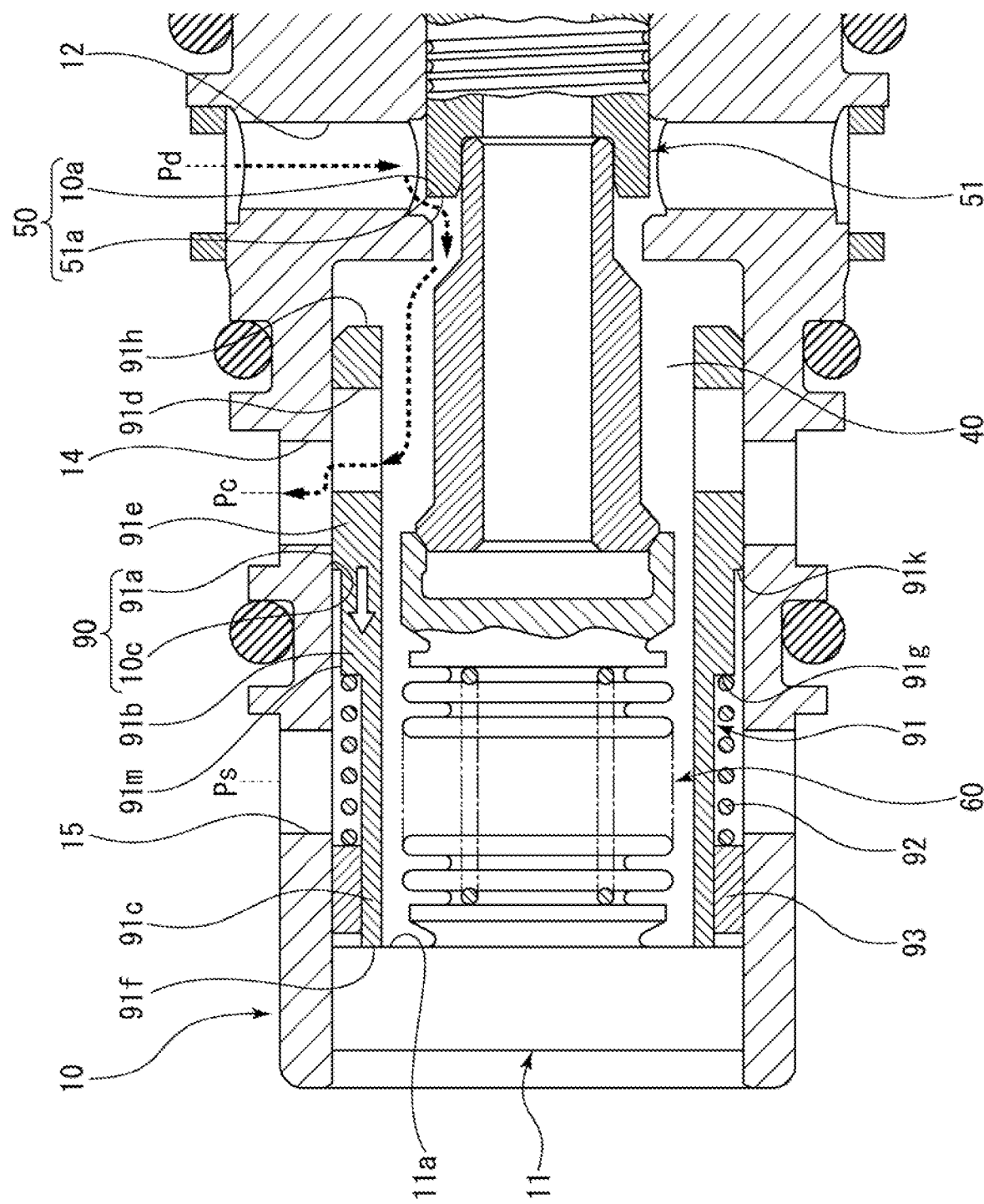
FIG. 5 is an enlarged cross-sectional view of FIG. 2 illustrating a state in which a first valve is opened and a differential pressure valve is closed when the capacity control valve according to the first embodiment is not energized (e.g., during normal control).

Further, when decreasing the output of the variable displacement compressor M from the maximum capacity state, as illustrated in FIG. 5, the capacity control valve V is not energized so that the second valve 54 is closed. At this time, the first valve portion 51a of the main valve element 51 is separated from the first valve seat 10a formed in the inner peripheral surface of the valve housing 10 so that the first valve 50 is opened.

In this way, in the non-energized state of the capacity control valve V, a fluid inside the discharge chamber 2 of the variable displacement compressor M flows from the Pd port 12 into the Pc port 14 through the capacity control valve V when the first valve 50 is opened (as indicated by a dotted arrow in FIG. 5). This is because the discharge pressure Pd is higher than the control pressure Pc.

Since the discharge pressure Pd flows into the control chamber 4, the control pressure Pc is higher than the control pressure Pc before the non-energized state (e.g., the maximum capacity state), is higher than the suction pressure Ps, and is expressed by a relational expression of Pd≥Pc>Ps. At this time, the differential pressure valve element 91 moves to the left axial side against the urging force of the coil spring 92 by the control pressure Pc (i.e., Pc>Ps) of the control chamber 4 (i.e., the pressure-sensitive chamber 40) higher than the suction pressure Ps so that the differential pressure valve 90 is closed.

Accordingly, when the capacity control valve V of the present embodiment is in the non-energized state, the first valve 50 is opened so that the control pressure Pc is higher than the suction pressure Ps. Accordingly, the differential pressure valve 90 is closed so as to interrupt the communication between the Pc port 14 and the second Ps port 15 and the flow path between the pressure-sensitive chamber 40 and the control chamber 4 can be communicated by the through-hole 91d of the differential pressure valve element 91 and the Pc port 14. For this reason, the control pressure Pc of the control chamber 4 can be reliably increased and the output of the variable displacement compressor M can be decreased to a desired output.

Further, in the differential pressure valve element 91 of the present embodiment, since the axial dimension B of the overlapping openings of the through-hole 91d and the Pc port 14 is larger than the axial dimension A of the differential pressure valve portion 91a sliding on the differential pressure valve seat 10c of the valve housing 10, the amount of the discharge pressure Pd flowing into the pressure-sensitive chamber 40 is controlled by adjusting the opening degree or the opening time of the first valve 50 in such a manner that the energized state and the non-energized state are switched according to the duty control of the capacity control valve V. Accordingly, as illustrated in FIG. 6, the differential pressure valve element 91 is slightly moved to the left axial side by the control pressure Pc so that the pressure-sensitive chamber 40 and the control chamber 4 can communicate with each other by the through-hole 91d and the Pc port 14 and the differential pressure valve 90 can be balanced in an open state.

Figure 6:
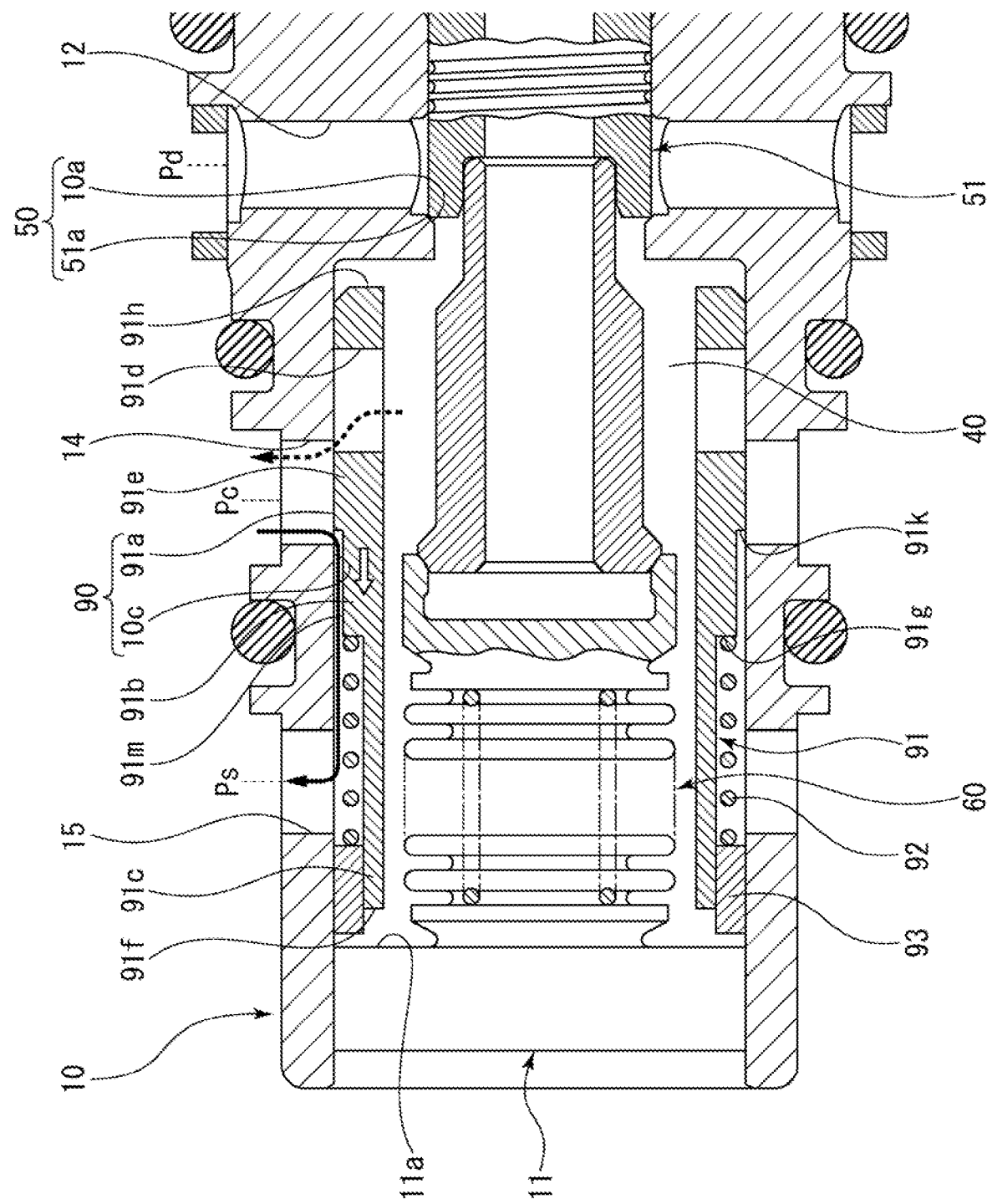
FIG. 6 is an enlarged cross-sectional view illustrating a state in which a differential pressure valve is opened so as to allow a communication of a differential pressure communication path and a flow path communicating a pressure-sensitive chamber and a control chamber during normal control (duty control) of the capacity control valve according to the first embodiment.

Accordingly, the through-hole 91d of the differential pressure valve element 91 communicates with the Pc port 14 and a flow path (indicated by a dotted arrow in FIG. 6) through which the control pressure Pc inside the pressure-sensitive chamber 40 flows into the control chamber 4 is opened so as to increase the control pressure Pc of the control chamber 4 and the differential pressure valve 90 is opened so as to maintain a communication state of the differential pressure communication path (indicated by a solid arrow in FIG. 6). Accordingly, the control pressure Pc of the control chamber 4 and the suction pressure Ps of the suction chamber 3 can be equalized and maintained at a desired pressure higher than that of the maximum capacity state. Further, when the control pressure Pc of the control chamber 4 and the suction pressure Ps of the suction chamber 3 are balanced, the differential pressure valve element 91 moves to the right axial side by receiving the urging force of the coil spring 92, the differential pressure valve 90 is opened, and the flow path between the pressure-sensitive chamber 40 and the control chamber 4 is closed while the communication of the differential pressure communication path is maintained (see FIGS. 3 and 4). For that reason, the variable displacement compressor M can be easily maintained at a desired output and the operation efficiency can be increased.

Further, in the differential pressure valve element 91, since a pressure receiving surface (that is, the side surface 91g extending in the radial direction of the right axial end of the attachment portion 91c and the side surface 91k extending in the radial direction of the left axial end of the sliding portion 91e) for the suction pressure Ps applied to the right axial side corresponding to the valve opening direction of the differential pressure valve 90 faces a pressure receiving surface (for example, the end surface portion 91h of the right axial end of the sliding portion 91e) for the control pressure Pc applied to the left axial side corresponding to the valve closing direction in the axial direction, the differential pressure valve element 91 can easily move in the axial direction by the differential pressure between the control pressure Pc and the suction pressure Ps.

Further, since the differential pressure valve 90 includes the differential pressure valve element 91 which has a substantially cylindrical shape and the coil spring 92 which urges the differential pressure valve element 91 in the valve opening direction of the differential pressure valve 90 and is disposed concentrically on the outer radial side of the pressure-sensitive valve 53 (or the pressure-sensitive element 60), the capacity control valve V with the differential pressure valve 90 can be made compact.

Further, since the coil spring 92 which urges the differential pressure valve element 91 to the right axial side corresponding to the valve opening direction is provided, the differential pressure valve element 91 can be reliably moved to the valve closing position when the differential pressure for the differential pressure valve element 91 in the axial direction is small.

Further, since the Pc pressure receiving surface (for example, the end surface portion 91h) of the differential pressure valve element 91 receiving the control pressure Pc of the control chamber 4 and the pressure-sensitive chamber 40 faces the side surfaces 91g and 91k of the differential pressure valve element 91 receiving the suction pressure Ps in the axial direction, the inclination of the differential pressure valve element 91 is difficult and the movement of the differential pressure valve element 91 in the axial direction is smooth.

Further, since the differential pressure valve element 91 is formed such that the outer peripheral surface of the sliding portion 91e is guided by the inner peripheral surface of the valve housing 10 and the outer peripheral surface of the attachment portion 91c is guided by the inner peripheral surface of the annular sealing member 93 fixed to the inner peripheral surface of the valve housing 10, the opening and closing operation of the differential pressure valve 90 can be stably performed. Accordingly, the structure of the differential pressure valve 90 can be simplified.

Further, when the differential pressure valve element 91 is urged in the valve opening direction of the differential pressure valve 90, the end surface portion 91h of the right axial end of the sliding portion 91e comes into contact with the inner surface of the valve housing 10 (partially defining the pressure-sensitive chamber 40) and hence the maximum opening area of the differential pressure valve 90 can be set by the contact of the end surface portion 91h of the differential pressure valve element 91 with respect to the inner surface of the valve housing 10. Further, when the differential pressure valve element 91 is urged in the valve closing direction of the differential pressure valve 90, the end surface portion 91f of the left axial end of the attachment portion 91c comes into contact with the right axial end surface 11a of the partition adjustment member 11 and hence the valve closing position for reliably closing the differential pressure valve 90 can be set. For that reason, the structure of the differential pressure valve 90 can be simplified.

Further, since the valve housing 10 is provided with the second Ps port 15 which communicates with the suction chamber 3 and constitutes the differential pressure communication path (as indicated by a solid arrow in FIGS. 4 and 6) opened and closed by the differential pressure valve 90 separately from the first Ps port 13 which communicates with the suction chamber 3 through the intermediate communication path 55 by opening and closing the pressure-sensitive valve 53, the structure of the valve housing 10 can be simplified.

Second Embodiment

Figure 7:
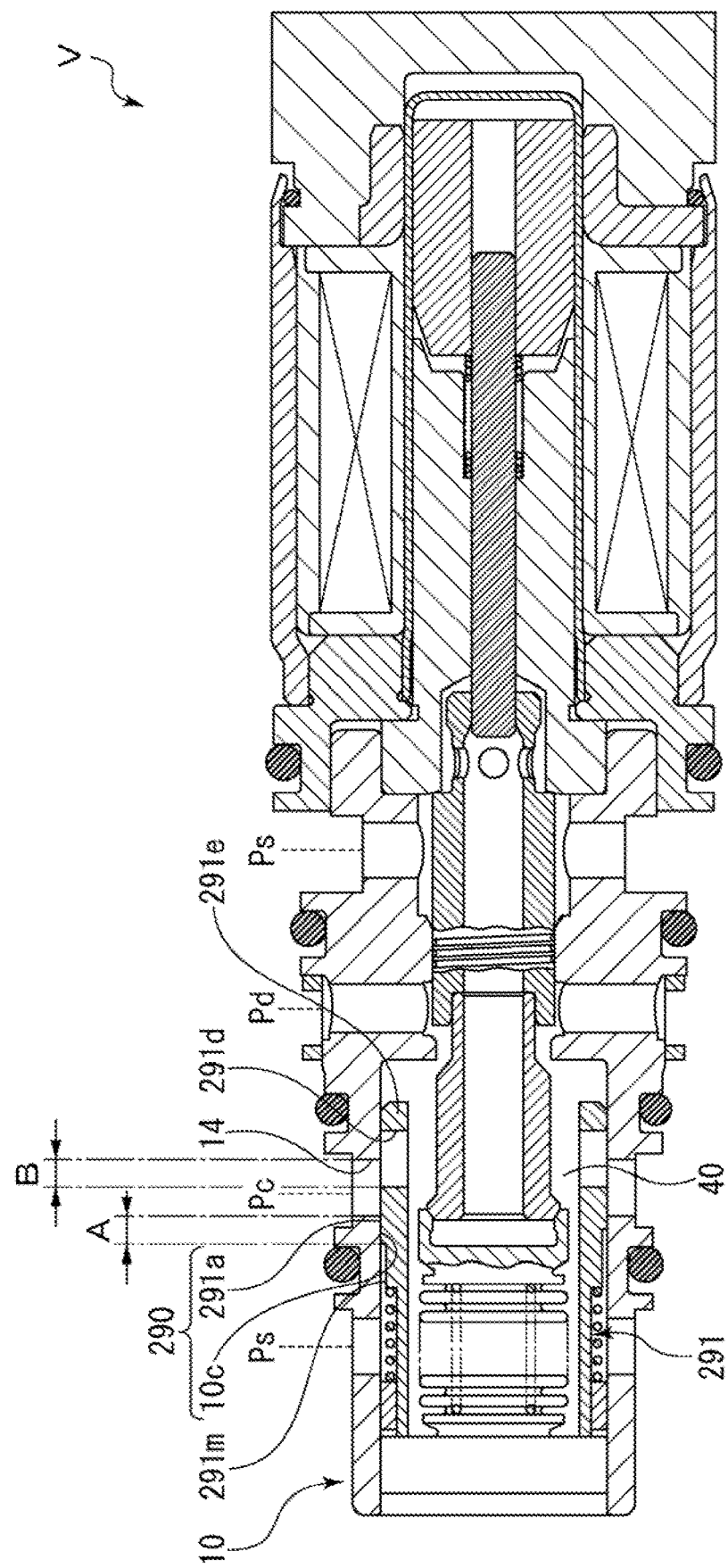
FIG. 7 is a cross-sectional view illustrating a state in which a first valve is opened and a differential pressure valve is closed when a capacity control valve according to a second embodiment of the present invention is not energized.

Next, a capacity control valve according to a second embodiment will be described with reference to FIG. 7. In addition, the same reference numerals will be given to the same components as those of the above-described embodiment and redundant description will be omitted.

A capacity control valve V of the second embodiment will be described. As illustrated in FIG. 7, in the present embodiment, in a differential pressure valve element 291, the axial dimensions and the formation positions of a sliding portion 291e and a flow path portion 291m are formed so that the axial dimension A of a differential pressure valve portion 291a sliding on the differential pressure valve seat 10c of the valve housing 10 is the same as the axial dimension B of the overlapping openings of a through-hole 291d and the Pc port 14 (i.e., A=B).

Accordingly, when the differential pressure valve element 291 is moved in the axial direction by adjusting the control pressure Pc of the pressure-sensitive chamber 40 according to the duty control of the capacity control valve V, a state in which the pressure-sensitive chamber 40 communicates with the control chamber 4 by the through-hole 291d and the Pc port 14 and a state in which the differential pressure valve 290 is opened can be switched.

Third Embodiment

Figure 8:
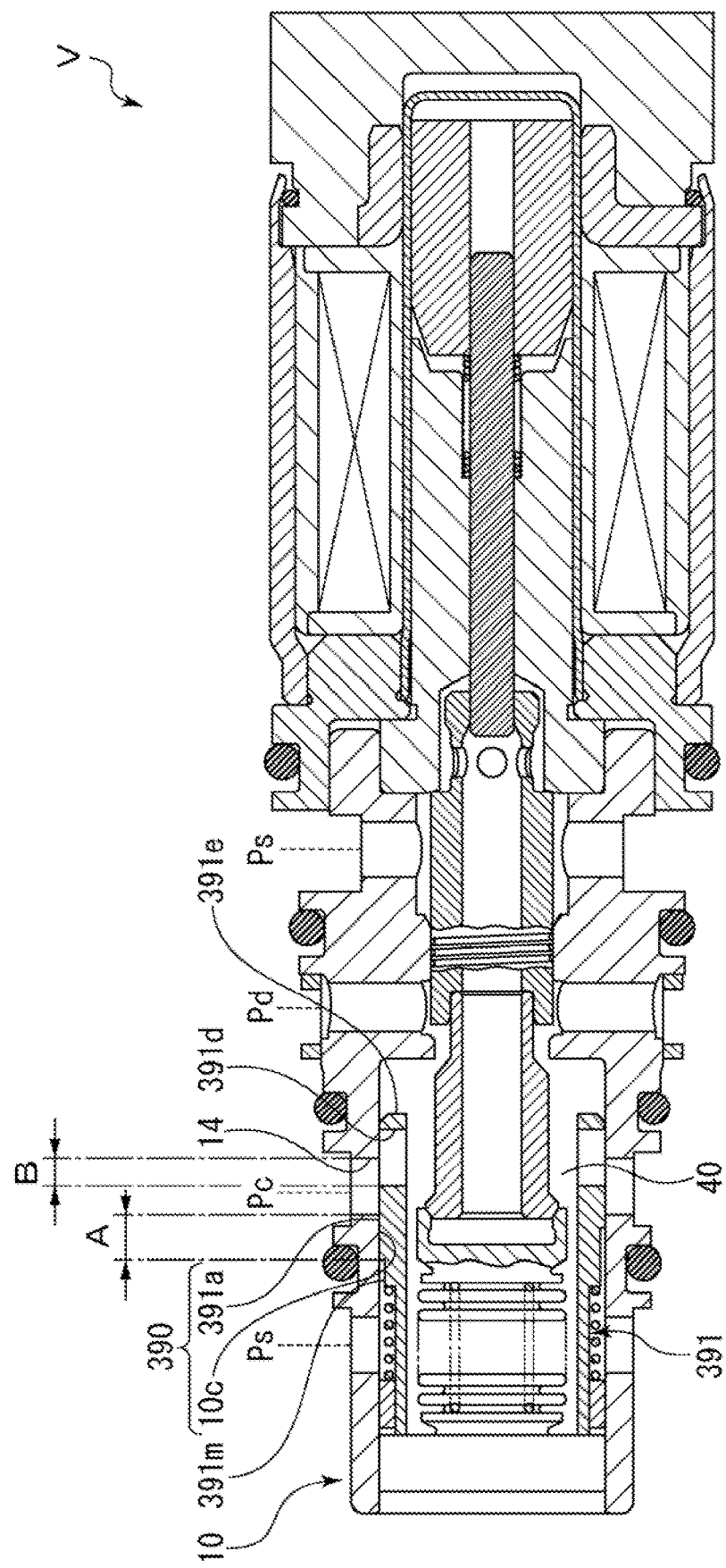
FIG. 8 is a cross-sectional view illustrating a state in which a first valve is opened and a differential pressure valve is closed when a capacity control valve according to a third embodiment of the present invention is not energized.

Next, a capacity control valve according to a third embodiment will be described with reference to FIG. 8. In addition, the same reference numerals will be given to the same components as those of the above-described embodiment and redundant description will be omitted.

A capacity control valve V of the third embodiment will be described. As illustrated in FIG. 8, in the present embodiment, in a differential pressure valve element 391, the axial dimensions and the formation positions of a sliding portion 391e and a flow path portion 391m are formed so that the axial dimension B of the overlapping openings of a through-hole 391d and the Pc port 14 is smaller than the axial dimension A of a differential pressure valve portion 391a sliding on the differential pressure valve seat 10c of the valve housing 10 (i.e., A>B).

Accordingly, when the differential pressure valve element 391 is moved in the axial direction by adjusting the control pressure Pc of the pressure-sensitive chamber 40 according to the duty control of the capacity control valve V, a state in which the pressure-sensitive chamber 40 communicates with the control chamber 4 by the through-hole 391d and the Pc port 14 and a state in which the differential pressure valve 390 is opened can be switched at different timings.

Although the embodiments of the present invention have been described above with reference to the drawings, a detailed configuration is not limited to these embodiments and modifications or additions in the scope not departing from the spirit of the present invention are also included in the present invention.

For example, in the above-described embodiments, the differential pressure valve element has been described such that a dimensional relationship between the axial dimension A of the differential pressure valve portion sliding on the differential pressure valve seat 10c of the valve housing 10 and the axial dimension B of the overlapping openings of the through-hole and the Pc port 14 is adjusted by the axial dimensions and the formation positions of the sliding portion and the flow path portion, but the present invention is not limited thereto. For example, the dimensional relationship may be adjusted by the dimension and the formation position of the through-hole formed in the sliding portion of the differential pressure valve element or the Pc port of the valve housing.

Further, the communication path and the fixed orifice which directly communicate the control chamber 4 and the suction chamber 3 of the variable displacement compressor M with each other may not be provided.

Further, in the above-described embodiments, the second valve may not be provided and the second valve portion of the main valve element may function as a support member that receives an axial load and does not essentially need a sealing function.

Further, the differential pressure valve and the Pc port may be provided inside the second valve chamber.

Further, the second valve chamber 30 may be provided on the side opposite to the solenoid 80 in the axial direction and the pressure-sensitive chamber 40 may be provided on the side of the solenoid 80.

Further, the coil spring 92 is not limited to a compression spring, but may be a tension spring or have a shape other than a coil shape.

Further, the pressure-sensitive element 60 may not use a coil spring therein.

REFERENCE SIGNS LIST

1 Casing
2 Discharge chamber
3 Suction chamber
4 Control chamber
10 Valve housing
10a First valve seat (main valve seat)
10c Differential pressure valve seat
11 Partition adjustment member (valve housing)
12 Pd port
13 First Ps port
14 Pc port
15 Second Ps port
20 First valve chamber
30 Second valve chamber
40 Pressure-sensitive chamber
50 First valve (main valve)
51 Primary valve element
51a First valve portion (main valve portion)
51b Second valve portion
51c Through-hole
52 Pressure-sensitive valve member
52a Pressure-sensitive valve seat
53 Pressure-sensitive valve
54 Second valve
55 Intermediate communication path
60 Pressure-sensitive element
61 Bellows core
62 Coil spring
70 Adapter
70a Right axial end
80 Solenoid
82 Fixed iron core
82a Second valve seat
90 Differential pressure valve
91 Differential pressure valve element
91a Differential pressure valve portion
91b Base portion
91c Attachment portion
91d Through-hole
91e Sliding portion
91f End surface portion
91g Side surface
91h End surface portion
91k Side surface
91m Flow path portion
92 Coil spring (spring)

93 Sealing member
290 Differential pressure valve
291 Differential pressure valve element
291a Differential pressure valve portion
291d Through-hole
291e Sliding portion
291m Flow path portion
390 Differential pressure valve
391 Differential pressure valve element
391a Differential pressure valve portion
391d Through-hole
391e Sliding portion
391m Flow path portion
Pc Control pressure
Pd Discharge pressure
Ps Suction pressure
V Capacity control valve

The invention claimed is:

1. A capacity control valve comprising:
a valve housing provided with a Pc port, a Pd port, a first Ps port and a second Ps port;
a main valve element which includes a main valve portion configured to come into contact with and separating from a main valve seat to close and open a communication between the Pd port and the Pc port by a drive force of a solenoid;
an intermediate communication path configured to communicate with the Pc port and the first Ps port;
a pressure sensitive chamber;
a pressure-sensitive valve disposed in the pressure sensitive chamber and configured to open and close the intermediate communication path; and
a differential pressure valve including a differential pressure valve element configured to open and close a communication between the Pc port and the second Ps port, and a communication between the Pc port and the pressure-sensitive chamber by the differential pressure valve element moved by a pressure of the pressure sensitive chamber.

2. The capacity control valve according to claim 1, wherein the differential pressure valve element is provided with a Pc pressure receiving surface configured to receive a pressure from the pressure-sensitive chamber and a Ps pressure receiving surface configured to receive a pressure from the second Ps port, the Pc pressure receiving surface and the Ps pressure receiving surface facing away from each other.

3. The capacity control valve according to claim 1, further comprising a sealing member formed in an annular shape and disposed between an outer peripheral surface of the differential pressure valve element and an inner peripheral surface of the valve housing and the differential pressure valve element is provided so as to be slidable on the sealing member.

4. The capacity control valve according to claim 1, wherein when the differential pressure valve element is urged in a valve opening direction of the differential pressure valve, the differential pressure valve element comes into contact with an inner surface of the valve housing.

5. The capacity control valve according to claim 1, wherein when the differential pressure valve element is urged in a valve closing direction of the differential pressure valve, the differential pressure valve element comes into contact with a left inner surface of the valve housing.

6. The capacity control valve according to claim 1, further comprising:
a spring configured to urge the differential pressure valve element in a valve opening direction.

7. The capacity control valve according to claim 6, wherein the differential pressure valve element is provided with a Pc pressure receiving surface configured to receive a pressure from the pressure-sensitive chamber and a Ps pressure receiving surface configured to receive a pressure from the second Ps port, the Pc pressure receiving surface and the Ps pressure receiving surface facing away from each other.

8. The capacity control valve according to claim 1, wherein when the differential pressure valve element moves in a valve opening direction, the communication between the Pc port and the second Ps port is opened and the communication between the Pc port and the pressure-sensitive chamber is closed.

9. The capacity control valve according to claim 8, wherein the differential pressure valve element is formed in a cylindrical shape and is provided concentrically on an outer radial side of the pressure-sensitive valve.

10. The capacity control valve according to claim 8, further comprising:
a spring configured to urge the differential pressure valve element in the valve opening direction.

11. The capacity control valve according to claim 8, wherein the differential pressure valve element is provided with a Pc pressure receiving surface configured to receive a pressure from the pressure-sensitive chamber and a Ps pressure receiving surface configured to receive a pressure from the second Ps port, the Pc pressure receiving surface and the Ps pressure receiving surface facing away from each other.

12. The capacity control valve according to claim 8, further comprising a sealing member formed in an annular shape and disposed between an outer peripheral surface of the differential pressure valve element and an inner peripheral surface of the valve housing and the differential pressure valve element is provided so as to be slidable on the sealing member.

13. The capacity control valve according to claim 8, wherein when the differential pressure valve element is urged in the valve opening direction of the differential pressure valve, the differential pressure valve element comes into contact with an inner surface of the valve housing.

14. The capacity control valve according to claim 8, wherein when the differential pressure valve element is urged in a valve closing direction of the differential pressure valve, the differential pressure valve element comes into contact with a left inner surface of the valve housing.

15. The capacity control valve according to claim 1, wherein the differential pressure valve element is formed in a cylindrical shape and is provided concentrically on an outer radial side of the pressure-sensitive valve.

16. The capacity control valve according to claim 15, further comprising:
a spring configured to urge the differential pressure valve element in a valve opening direction.

17. The capacity control valve according to claim 15, wherein the differential pressure valve element is provided with a Pc pressure receiving surface configured to receive a pressure from the pressure-sensitive chamber and a Ps pressure receiving surface configured to receive a pressure from the second Ps port, the Pc pressure receiving surface and the Ps pressure receiving surface facing away from each other.

18. The capacity control valve according to claim 15, further comprising a sealing member formed in an annular shape and disposed between an outer peripheral surface of the differential pressure valve element and an inner peripheral surface of the valve housing and the differential pressure valve element is provided so as to be slidable on the sealing member.

19. The capacity control valve according to claim 15, wherein when the differential pressure valve element is urged in a valve opening direction of the differential pressure valve, the differential pressure valve element comes into contact with an inner surface of the valve housing.

20. The capacity control valve according to claim 15, wherein when the differential pressure valve element is urged in a valve closing direction of the differential pressure valve, the differential pressure valve element comes into contact with an inner surface of the valve housing.

* * * * *